United States Patent
Tsunoda et al.

(10) Patent No.: US 8,311,418 B2
(45) Date of Patent: Nov. 13, 2012

(54) OPTICAL COMMUNICATION APPARATUS AND OPTICAL COMMUNICATION METHOD

(75) Inventors: Yukito Tsunoda, Kawasaki (JP); Satoshi Ide, Kawasaki (JP); Kazuyuki Mori, Kawasaki (JP)

(73) Assignee: Fujitsu Optical Components Limited, Kawasaki (JP)

( * ) Notice: Subject to any disclaimer, the term of this patent is extended or adjusted under 35 U.S.C. 154(b) by 314 days.

(21) Appl. No.: 12/659,083

(22) Filed: Feb. 24, 2010

(65) Prior Publication Data

US 2010/0158541 A1 Jun. 24, 2010

Related U.S. Application Data

(63) Continuation of application No. PCT/JP2007/069306, filed on Oct. 2, 2007.

(51) Int. Cl.
*H04B 10/18* (2006.01)
(52) U.S. Cl. ............ 398/208; 398/81; 398/147; 398/158
(58) Field of Classification Search ................ 398/81, 398/147, 158, 208
See application file for complete search history.

(56) References Cited

U.S. PATENT DOCUMENTS

| 6,252,692 B1 * | 6/2001 | Roberts ........................ 398/147 |
| 2003/0002833 A1 | 1/2003 | Futami et al. |
| 2003/0229461 A1 | 12/2003 | Fujisaku |

FOREIGN PATENT DOCUMENTS

| JP | 62-291232 | 12/1987 |
| JP | 11-205245 | 7/1999 |
| JP | 2003-14548 | 1/2003 |
| JP | 2004-15587 | 1/2004 |
| JP | 2006-304170 | 11/2006 |

OTHER PUBLICATIONS

English Translation of the International Preliminary Report on Patentability dated May 14, 2010 and issued in corresponding International Patent Application PCT/JP2007/069306.
International Preliminary Report on Patentability, mailed Apr. 15, 2010, in corresponding PCT Application No. PCT/JP2007/069306 (5 pp.).
International Search Report for PCT/JP2007/069306, mailed Nov. 20, 2007.

* cited by examiner

*Primary Examiner* — Leslie Pascal
(74) *Attorney, Agent, or Firm* — Staas & Halsey LLP

(57) ABSTRACT

An optical communication apparatus includes a receiver configured to receive an optical signal transmitted from an optical transmitting apparatus; a detector configured to detect a predetermined pattern signal included in the optical signal; a calculator configured to calculate, based on a waveform of the predetermined pattern signal, an amount of dispersion of the predetermined pattern signal; and a compensator configured to compensate for dispersion according to the amount of dispersion.

10 Claims, 12 Drawing Sheets

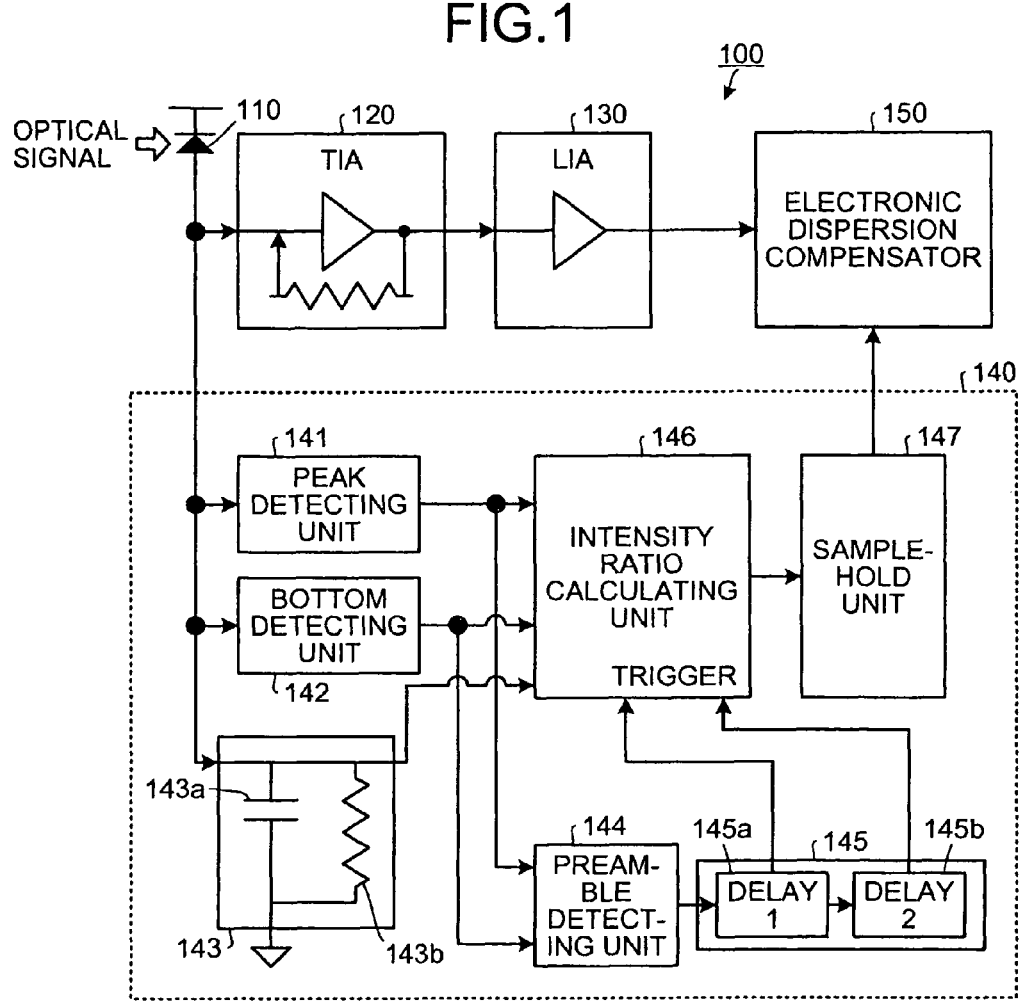
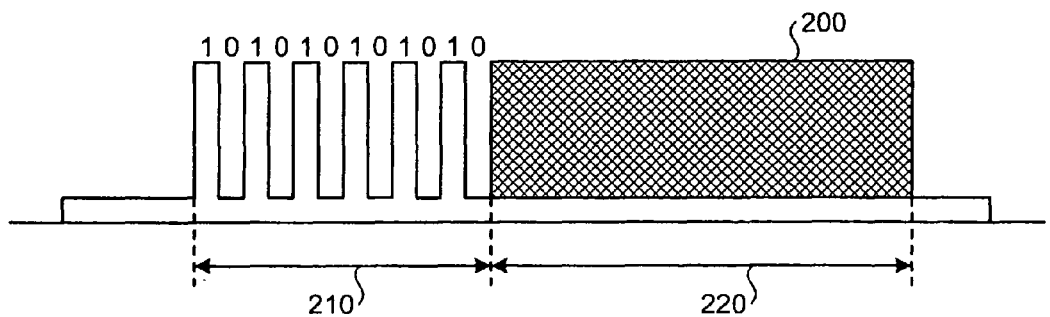

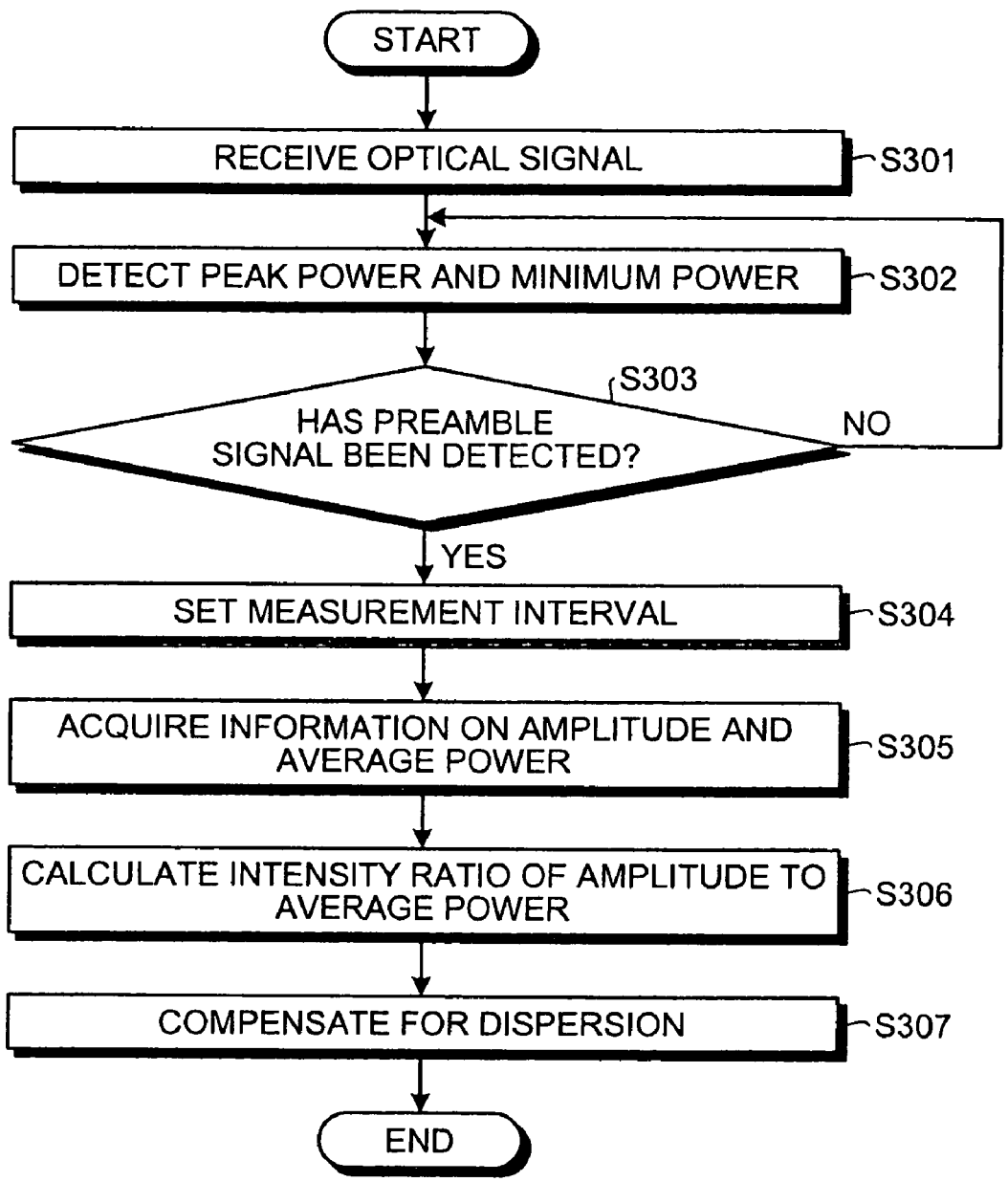

OPTICAL COMMUNICATION APPARATUS AND OPTICAL COMMUNICATION METHOD

CROSS REFERENCE TO RELATED APPLICATIONS

This is a continuing application, filed under 35 U.S.C. §111(a), of International Application PCT/JP2007/069306, filed Oct. 2, 2007, the contents of which are incorporated herein by reference.

FIELD

The embodiments discussed herein are related to an optical communication apparatus and an optical communication method to compensate an optical signal for dispersion.

BACKGROUND

Optical networks have been used as massive data transmission networks. A passive optical network (PON) system is one optical network system. In a PON system, optical network units (ONUs) send, in bursts, optical signals which are multiplexed at a star coupler and received by one optical line terminal (OLT).

To further speed up the PON system or to extend transmission distance with, for example, a super PON system, it is necessary to compensate for deterioration of optical signals due to dispersion caused by a transmission line. In a PON system, the amount of dispersion of each optical signal transmitted from each ONU and received at the OLT varies depending on the distance along the transmission line between the OLT and each ONU. Therefore, the OLT needs to perform dispersion compensation at amounts corresponding to the dispersion, which varies for each received optical signal.

Meanwhile, techniques have been disclosed in which a waveform of an optical signal is measured and the waveform of the optical signal is compensated based on the measured waveform (see, for example, Japanese Laid-Open Patent Publication Nos. 2004-15587, H11-205245, and 2003-14548). With this technique, it may be considered that the PON system computes the amount of dispersion of each optical signal, based on the waveform of each optical signal to perform dispersion compensation according to the amount of dispersion.

However, since patterns of optical signals coming from the ONUs are random, the amount of dispersion does not uniquely correspond to the distortion of waveform. Consequently, conventional techniques like those mentioned above have a problem in that it is difficult to compute the amount of dispersion of optical signals by measuring waveforms. This problem will be further discussed below.

FIG. 20 is an eye pattern of an optical signal transmitted in bursts (a burst signal) having dispersion. A distortion of waveform due to dispersion of the burst signal varies depending on the pattern of the optical signal. Therefore, as depicted in FIG. 20, an eye pattern of an optical signal having dispersion (for example, a cross point 2010 of the eye pattern) is not uniquely determined. As a result, the distortion of the waveform of the entire optical signal cannot be measured uniquely and thus, it is difficult to accurately calculate the amount of dispersion of the optical signal, based on the measurement of the waveform.

It may be thought to measure an average distortion of waveform for the entire optical signal but in this case, the average distortion is calculated after much of the optical signal is received; thus it takes time before the amount of dispersion is obtained. Therefore, a problem in this case is that the amount of dispersion of each optical signal coming sequentially from the ONUs cannot be calculated and the signals cannot be compensated one by one.

SUMMARY

According to an aspect of an embodiment, an optical communication apparatus includes a receiver configured to receive an optical signal transmitted from an optical transmitting apparatus; a detector configured to detect a predetermined pattern signal included in the optical signal; a calculator configured to calculate, based on a waveform of the predetermined pattern signal, an amount of dispersion of the predetermined pattern signal; and a compensator configured to compensate for dispersion according to the amount of dispersion.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a block diagram of an optical communication apparatus according to a first embodiment.

FIG. 2 is a diagram of an optical signal received by the optical communication apparatus.

FIG. 3 is a flowchart depicting an operation of the optical communication apparatus according to the first embodiment.

DESCRIPTION OF EMBODIMENTS

Figure 4:
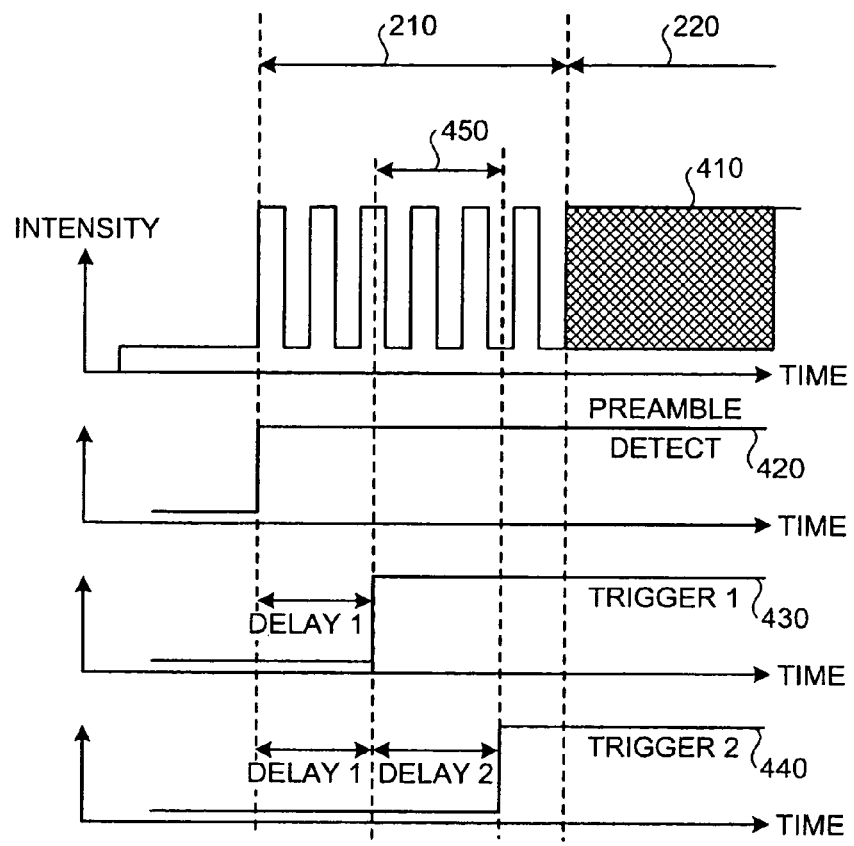
FIG. 4 is a time chart of an operation of the optical communication apparatus according to the first embodiment.

Preferred embodiments of the present invention will be explained with reference to the accompanying drawings.

FIG. 1 is a block diagram of an optical communication apparatus according to a first embodiment. As depicted in FIG. 1, an optical communication apparatus 100 according to the first embodiment includes a photodiode (PD) 110, a transimpedance amplifier (TIA) 120, a limiting amplifier (LIA) 130, a dispersion monitoring unit 140, and an electronic dispersion compensator 150. The PD 110, a receiving unit (a receiver), receives an incoming optical signal. The PD 110 converts the optical signal to an electrical signal and outputs the electrical signal to the TIA 120 and the dispersion monitoring unit 140.

The TIA 120 and the LIA 130 constitute an amplifier and amplify to a given amplitude, the signal output from the PD 110. The TIA 120 and the LIA 130 output the amplified signal to the electronic dispersion compensator 150.

The dispersion monitoring unit 140 includes a peak detecting unit 141, a bottom detecting unit 142, an average detecting unit 143, a preamble detecting unit (detector) 144, an interval setting unit 145, an intensity ratio calculating unit (calculator) 146, and a sample-hold unit 147. The peak detecting unit 141 detects peak power of the signal output from the PD 110. The peak power detecting unit 141 outputs to the preamble detecting unit 144 and the intensity ratio calculating unit 146, information on the peak power.

The bottom detecting unit 142 detects the minimum power of the signal output from the PD 110. The bottom detecting unit 142 outputs to the preamble detecting unit 144 and the intensity ratio calculating unit 146, information on the minimum power. The average detecting unit 143 detects average power of the signal output from the PD 110. In this embodiment, the average detecting unit 143 is a low-pass filter made up of a condenser 143a and a resistor 143b connected in parallel. The average detecting unit 143 outputs to the intensity ratio calculating unit 146, information on the average power.

The preamble detecting unit 144 determines a peak part and a bottom part of the signal received by the PD 110 based on the information provided by the peak detecting unit 141 and the bottom detecting unit 142, and detects a preamble signal included in the signal received by the PD 110. Upon detecting the preamble signal, the preamble detecting unit 144 outputs to the interval setting unit 145, a detection signal indicating that the preamble signal has been detected.

The interval setting unit 145, a setting unit, sets an interval for measuring the amount of dispersion in the preamble signal. For example, the interval setting unit 145 includes a delaying unit 145a (delay 1) and a delaying unit 145b (delay 2). Upon the preamble detecting unit 144 outputting the detection signal, the delaying unit 145a waits for a given time, delay 1, and then outputs a first trigger signal to the intensity ratio calculating unit 146 and the delaying unit 145b.

Upon the delaying unit 145a outputting the first trigger signal, the delaying unit 145b waits for a given time, delay 2, and then outputs a second trigger signal to the intensity ratio calculating unit 146. An interval of the preamble signal received at the interval setting unit 145 between the output of the first trigger signal and the output of the second trigger signal is set as a measurement interval for measuring the amount of dispersion.

The intensity ratio calculating unit 146, a calculating unit, calculates the amount of dispersion of the preamble signal detected by the preamble detecting unit 144. The intensity ratio calculating unit 146 calculates the amount of dispersion in the interval of the preamble signal set by the interval setting unit 145.

The intensity ratio calculating unit 146 calculates, for a period from the output of the first trigger signal until the output of the second trigger signal from the interval setting unit 145, a difference between the peak power indicated by the information from the peak detecting unit 141 and the minimum power indicated by the information from the bottom detecting unit 142, thereby obtaining information on amplitude of the signal output from the PD 110.

The intensity ratio calculating unit 146 also obtains, during the period from the output of the first trigger signal until the output of the second trigger signal from the interval setting unit 145, information on the average power output from the average detecting unit 143. The intensity ratio calculating unit 146 calculates an intensity ratio of amplitude to average power of the preamble signal based on the information on amplitude and average power.

The intensity ratio calculating unit 146 outputs the information on the intensity ratio, as information on dispersion of the preamble signal, to the sample-hold unit 147. The sample-hold unit 147 sets an amount of compensation for the electronic dispersion compensator 150 according to the amount of dispersion indicated by the information output from the intensity ratio calculating unit 146. The electronic dispersion compensator 150 performs dispersion compensation on the signal output from the TIA 120 and the LIA 130 according to the amount of compensation set by the sample-hold unit 147.

FIG. 2 is a diagram of an optical signal received by the optical communication apparatus. As depicted in FIG. 2, an optical signal 200 received by the optical communication apparatus 100 is a burst signal that includes a preamble signal 210 and a data signal 220. The preamble signal 210 is a fixed-pattern signal which is carried at the head of the optical signal 200 and the pattern of which is predetermined. The intensity ratio calculating unit 146 calculates the amount of dispersion of the preamble signal 210.

In this embodiment, the preamble signal 210 is a signal with an alternating pattern of "101010 . . . " (an alternating pattern signal). The data signal 220 carries data to be transmitted and is received after the preamble signal 210. In this embodiment, an example where the amount of dispersion of the preamble signal 210 is calculated was explained. However, a signal for which the amount of dispersion is calculated is not limited to the preamble signal 210. Any signal that has a predetermined pattern and is received before the data signal 220 may be used instead of the preamble signal 210.

FIG. 3 is a flowchart depicting an operation of the optical communication apparatus according to the first embodiment. As an example, a dispersion compensation operation that the optical communication apparatus 100 performs for one optical signal (burst signal) is explained. As depicted in FIG. 3, the PD 110 receives an incoming optical signal (step S301). The peak detecting unit 141 and the bottom detecting unit 142 detect the peak power and the minimum power of the signal, respectively (step S302).

The preamble detecting unit 144 determines whether a preamble signal has been detected (step S303). If a preamble signal has not been detected (step S303: NO), the process continues, returning to step S302. If the preamble signal has been detected (step S303: YES), the interval setting unit 145 sets an interval for measuring the amount of dispersion of the preamble signal (step S304).

The intensity ratio calculating unit 146 acquires information on the amplitude and the average power of the interval of the preamble signal set at step S304 (step S305). The intensity ratio calculating unit 146 calculates, based on the information acquired at step S305, the intensity ratio of the amplitude to the average power of the signal output from the PD 110 (step S306).

The electronic dispersion compensator 150 performs dispersion compensation based on the intensity ratio calculated at step S306 (step S307), and the dispersion compensation operation for one optical signal is completed. Similarly, the operation at steps S301 to S307 is repeated for sequentially received optical signals, whereby dispersion compensation for each optical signal is performed.

FIG. 4 is a time chart of an operation of the optical communication apparatus according to the first embodiment. In FIG. 4, items identical to those depicted in FIG. 2 are given the same reference numerals used in FIG. 2 and repetitive explanations are omitted. In FIG. 4, the horizontal axis represents time. The vertical axis represents intensity of each signal. Reference numeral 410 indicates a signal received by the PD 110 (see FIG. 2). The signal 410 includes the preamble signal 210 and the data signal 220.

Reference numeral 420 (Preamble detect) is a detection signal output from the preamble detecting unit 144 to the interval setting unit 145. The detection signal 420 is output to the interval setting unit 145 when the preamble signal 210 is received by the PD 110. Reference numeral 430 (Trigger 1) indicates the first trigger signal output from the delaying unit 145a to the intensity ratio calculating unit 146.

The first trigger signal 430 is delayed by a given time, delay 1, with respect to the detection signal 420 and is output to the intensity ratio calculating unit 146. Reference numeral 440 (Trigger 2) indicates the second trigger signal output from the delaying unit 145b to the intensity ratio calculating unit 146. The second trigger signal 440 is delayed by a given time, delay 2, with respect to the first trigger signal 430 and is output to the intensity ratio calculating unit 146.

An interval 450 is an interval of the signal 410 for which the intensity ratio calculating unit 146 calculates an amount of dispersion. For example, the interval 450 is an interval of the signal 410 received by the PD 110 during the period from the output of the first trigger signal 430 until the output of the second trigger signal 440 to the intensity ratio calculating unit 146.

Signal amplification by the TIA 120 and the LIA 130 is performed in parallel with calculation of the amount of dispersion by the intensity ratio calculating unit 146. As a result, the electronic dispersion compensator 150 performs dispersion compensation of an interval after the interval 450 in the signal 410.

The interval 450 can be adjusted by setting delay 1 of the delaying unit 145a and setting delay 2 of the delaying unit 145b. Delay 1 and delay 2 are set so that the interval 450 covers part of or all of the preamble signal 210; whereby the amount of dispersion of the entire signal 410 can be calculated while the preamble signal 210 is being received.

In this way, the amount of dispersion of the signal 410 can be calculated before the data signal 220 is received. As a result, at least the data signal 220 in the signal 410 can be compensated for dispersion by an amount of compensation corresponding to the calculated dispersion. The interval 450 may be part of the preamble signal 210 as depicted in FIG. 4 or the entire preamble signal 210.

In this embodiment, since the preamble signal 210 is the alternating pattern signal of "101010 . . . ", the interval 450 may be the first two bits ("10") of the preamble signal 210 to detect the peak power, the minimum power, and the average power of the preamble signal 210. Namely, the amount of dispersion of the optical signal 200 can be acquired merely by measurement of the waveform of at least the first two bits of the preamble signal 210.

Figure 5:
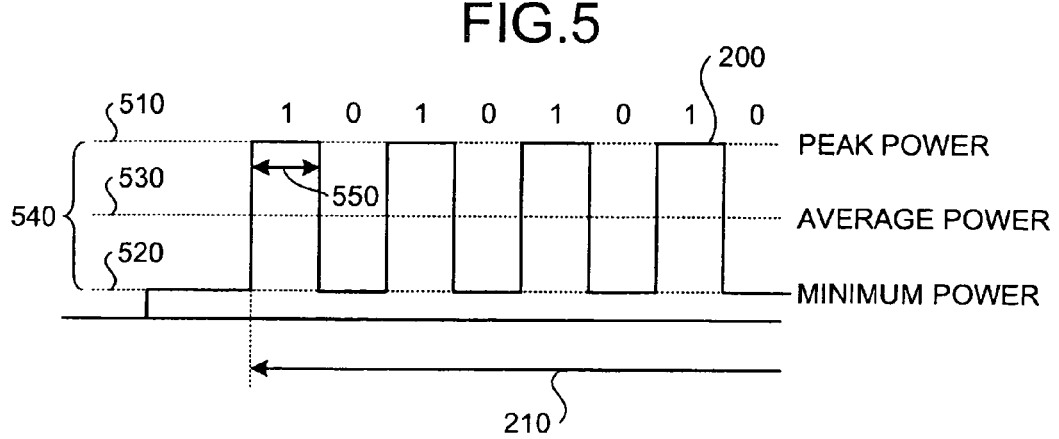
FIG. 5 is a diagram depicting a waveform of a preamble signal with small dispersion.
Figure 6:
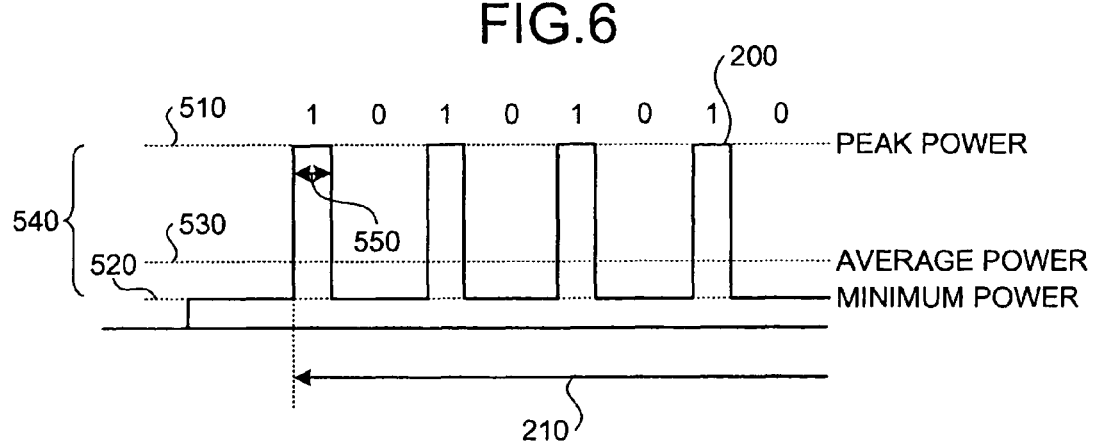
FIG. 6 is a diagram depicting a waveform of a preamble signal with large dispersion.

FIG. 5 is a diagram depicting a waveform of a preamble signal with small dispersion. FIG. 6 is a diagram depicting a waveform of a preamble signal with large dispersion. In FIG. 5 and FIG. 6, items identical to those depicted in FIG. 2 are given the same reference numerals used in FIG. 2 and repetitive explanations are omitted. Reference numerals 510, 520, and 530 denote the peak power, the minimum power, and the average power of the preamble signal 210, respectively.

Reference numeral 540 denotes amplitude of the preamble signal 210. The amplitude 540 is a measure between the peak power 510 and the minimum power 520. Reference numeral 550 denotes a pulse width of the preamble signal 210. As depicted in FIG. 5 and FIG. 6, when the amount of dispersion is large (FIG. 6), compared with a case where the amount of dispersion is small (FIG. 5), the pulse width 550 of the preamble signal 210 becomes narrower.

As a result, when the amount of dispersion of the optical signal 200 is large, the average power 530 decreases in comparison with a case where the amount of dispersion of the optical signal 200 is small. Therefore, the intensity ratio of the amplitude 540 to the average power 530 of the preamble signal 210 varies according to the amount of dispersion of the optical signal 200. The intensity ratio calculating unit 146 calculates the intensity ratio of the amplitude 540 to the average power 530 of the preamble signal 210, thereby acquiring information on the amount of dispersion of the optical signal 200.

Figure 7:
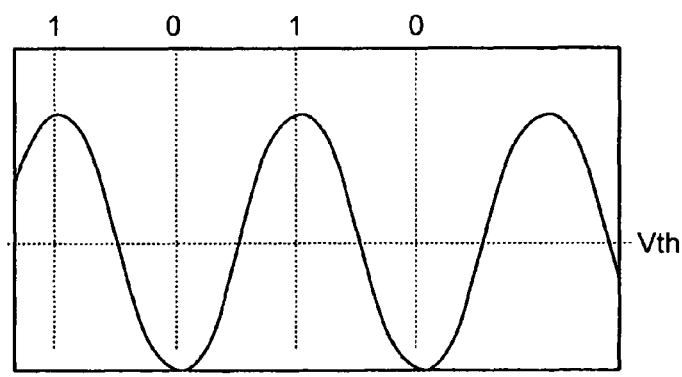
FIG. 7 is a waveform diagram of a simulated alternating pattern signal without dispersion.
Figure 8:
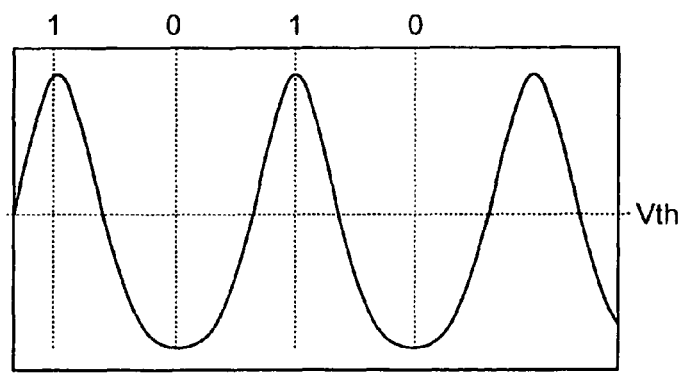
FIG. 8 is a waveform diagram of a simulated alternating pattern signal with small dispersion.
Figure 9:
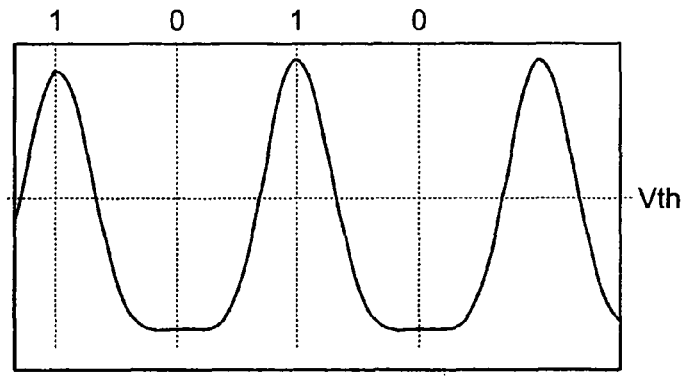
FIG. 9 is a waveform diagram of a simulated alternating pattern signal with large dispersion.

FIG. 7 is a waveform diagram of a simulated alternating pattern signal without dispersion. FIG. 8 is a waveform diagram of a simulated alternating pattern signal with small dispersion. FIG. 9 is a waveform diagram of a simulated alternating pattern signal with large dispersion. In FIG. 7 to FIG. 9, the horizontal axis represents time. The vertical axis represents intensity of the alternating pattern signal of "101010 . . . ". $V_{th}$ on the vertical axis denotes a central value between the peak power and the minimum power of the alternating pattern signal. As can be seen from FIG. 7 to FIG. 9, the pulse width of the alternating pattern signal becomes narrower as the amount of dispersion increases.

Figure 10:
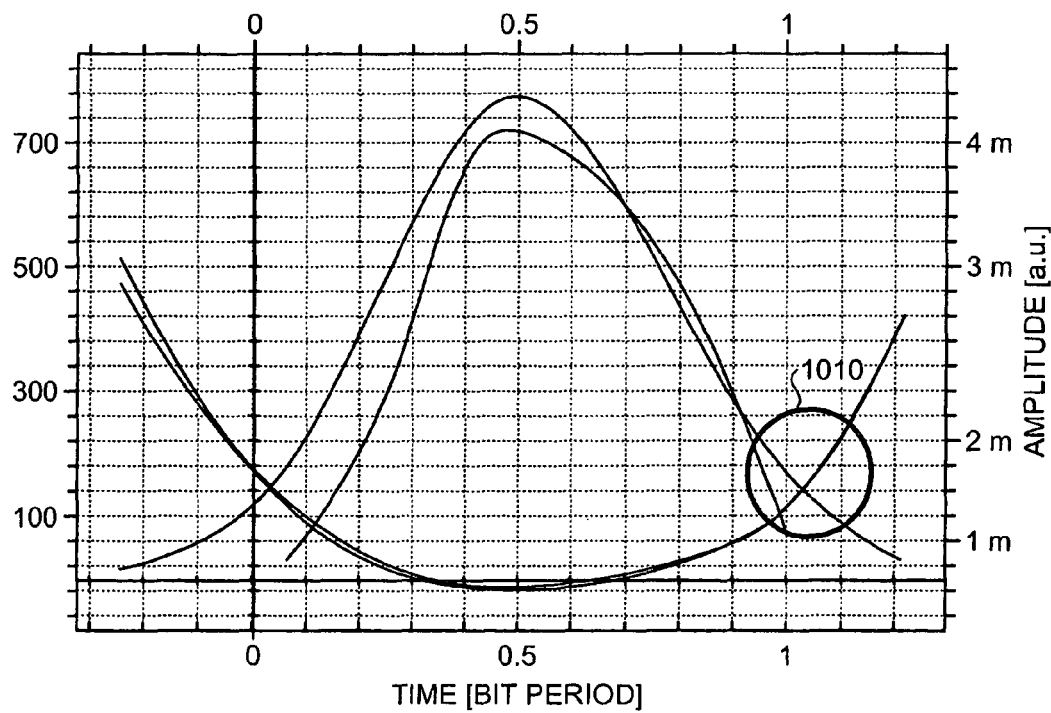
FIG. 10 is an eye pattern of the alternating pattern signal depicted in FIG. 7 through FIG. 9.

FIG. 10 is an eye pattern of the alternating pattern signals depicted in FIG. 7 through FIG. 9. In FIG. 10, the horizontal axis represents time (bit period). The vertical axis represents amplitude (a.u.). As depicted in FIG. 10, an eye pattern (for example, a cross point 1010 of the eye pattern) of the alternating pattern signal of "101010 . . . " is uniquely determined.

Consequently, the amount of dispersion of the alternating pattern signal can be determined accurately. Furthermore, measurement of a part of the waveform of the alternating pattern signal alone enables an accurate determination of the amount of dispersion. For instance, the measurement of waveform for only two bits ("10") of the alternating pattern signal of "101010 . . . " enables accurate calculation of dispersion. As a result, the amount of dispersion can be calculated quickly.

The optical communication apparatus 100 according to the first embodiment calculates the amount of dispersion based on the waveform of the preamble signal 210 of the optical signal 200; whereby the amount of dispersion of the optical signal 200 is accurately and swiftly calculated. Further, the data signal 220 of the optical signal 200 is compensated for dispersion based on the calculated amount of dispersion; whereby the data signal 220 is compensated accurately and swiftly.

As a result of the accurate and swift calculation of dispersion, even if an optical signal with unknown dispersion is received, the optical signal is compensated for dispersion by a proper amount of compensation. In this way, when the optical communication apparatus 100 sequentially receives optical signals having different amounts of dispersion from optical transmitting apparatuses in for example a PON, the amount of dispersion is calculated for each optical signal and each optical signal is individually compensated for dispersion.

Figure 11:
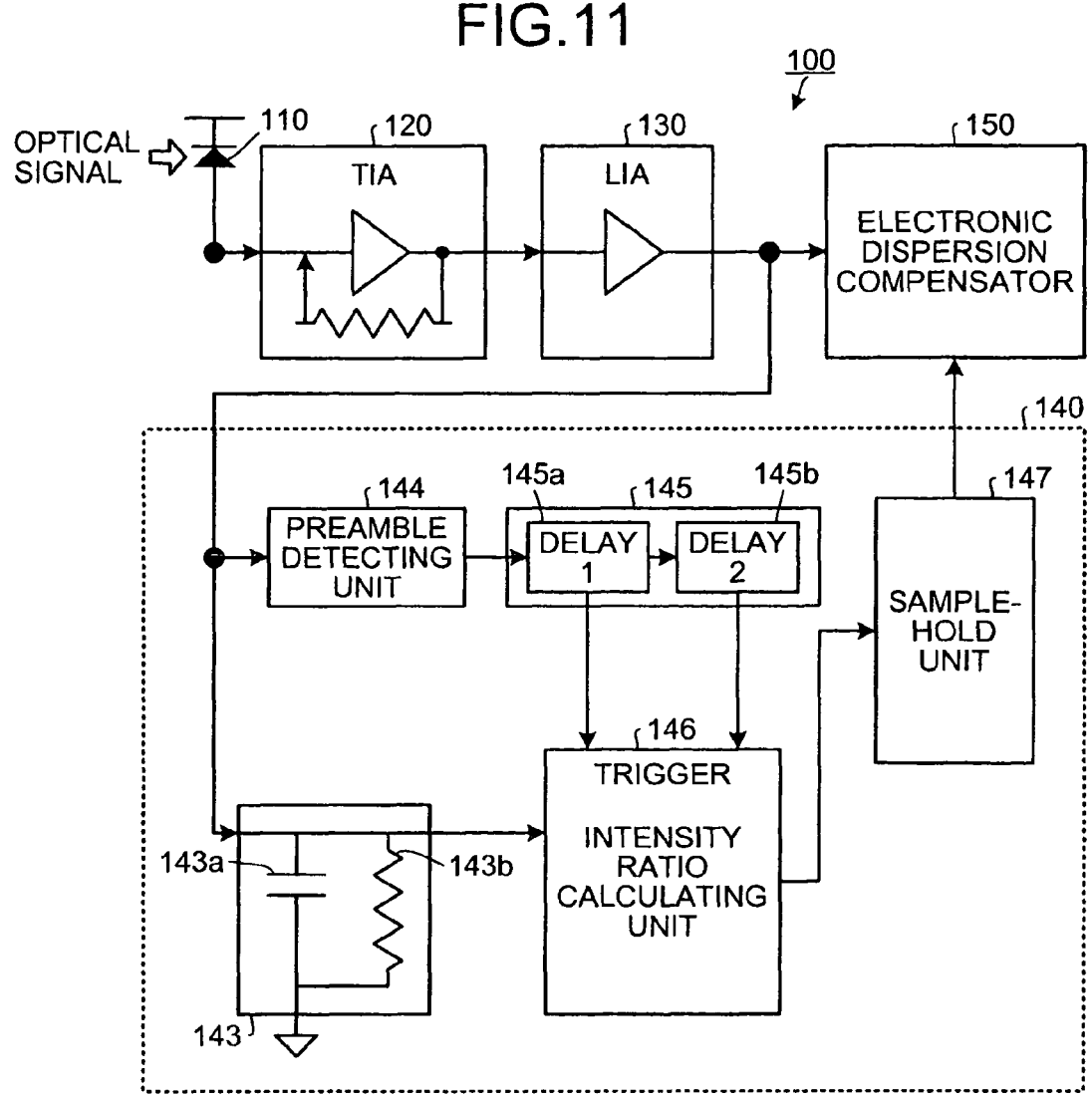
FIG. 11 is a block diagram of an optical communication apparatus according to a second embodiment.

FIG. 11 is a block diagram of an optical communication apparatus according to a second embodiment. Items identical to those depicted in FIG. 1 are given the same reference numerals used in FIG. 1 and repetitive explanations are omitted. As depicted in FIG. 11, an optical communication apparatus 100 according to the second embodiment does not include the peak detecting unit 141 or the bottom detecting unit 142 included in the optical communication apparatus 100 according to the first embodiment (see FIG. 1).

The PD 110 converts an optical signal to an electrical signal and outputs the signal to the TIA 120. The TIA 120 and the LIA 130 output an amplified signal to the electronic dispersion compensator 150 and the dispersion monitoring unit 140. The average detecting unit 143 of the dispersion monitoring unit 140 detects the average power of the signal output from the TIA 120 and the LIA 130.

The preamble detecting unit 144 determines a peak part and a bottom part of the signal output from the TIA 120 and the LIA 130 to detect a preamble signal having a predetermined pattern. The intensity ratio calculating unit 146 acquires information on the average power of the signal output from the PD 110 during the period from the output of the first trigger signal until the output of the second trigger signal from the interval setting unit 145.

For example, the intensity ratio calculating unit 146 acquires information on the average power output from the average detecting unit 143 during the period from the output of the first trigger signal until the output of the second trigger signal from the interval setting unit 145. The intensity ratio calculating unit 146 calculates the intensity ratio of the amplitude set at the TIA 120 and the LIA 130 to the average power. The intensity ratio calculating unit 146 outputs to the sample-hold unit 147, information on the intensity ratio as information on the amount of dispersion of the preamble signal included in the signal output from the PD 110.

Figure 12:
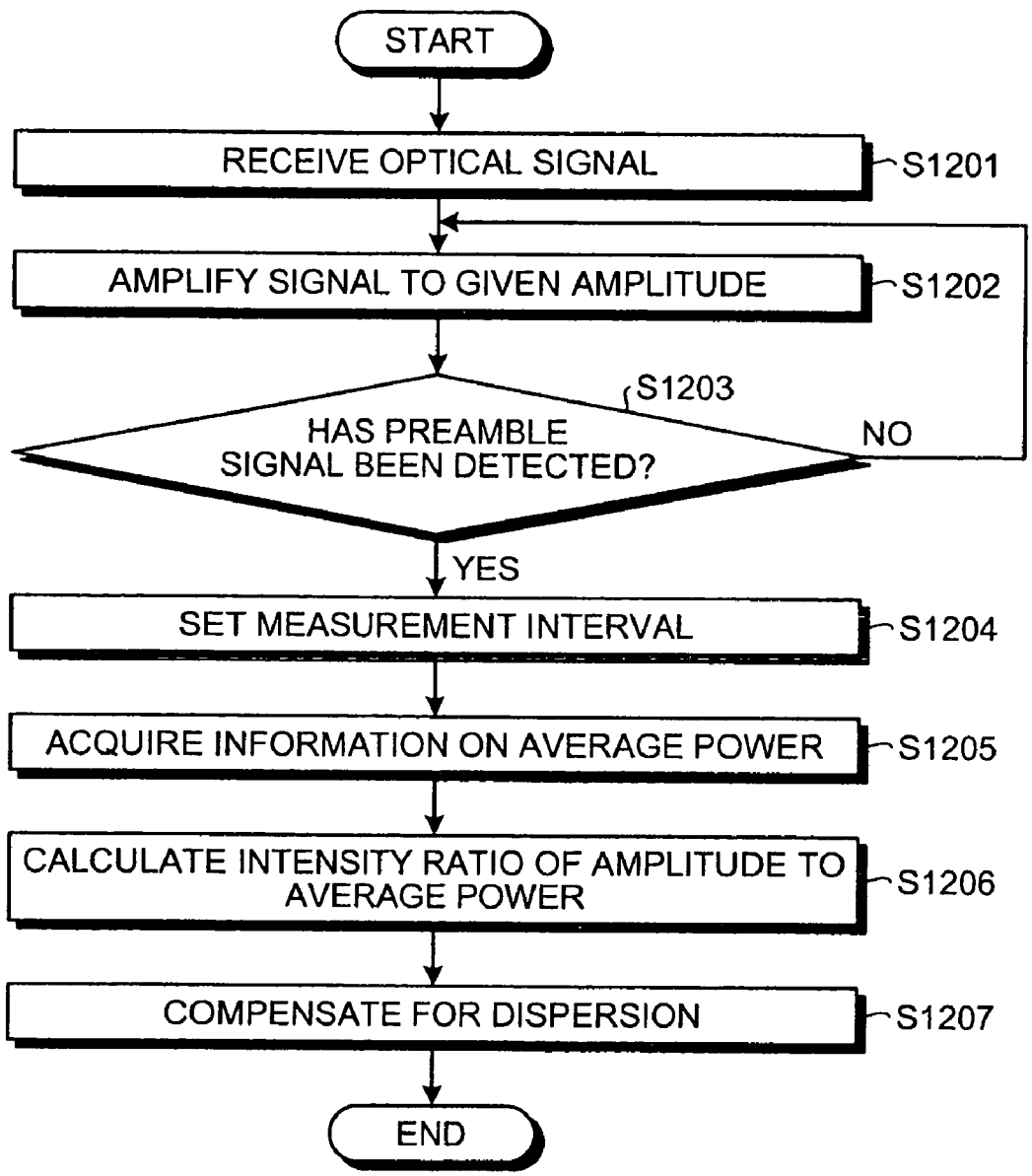
FIG. 12 is a flowchart depicting an operation of the optical communication apparatus according to the second embodiment.

FIG. 12 is a flowchart depicting an operation of the optical communication apparatus according to the second embodiment. As an example, a dispersion compensation operation that the optical communication apparatus 100 performs for one optical signal (burst signal) is explained. As depicted in FIG. 12, the PD 110 receives an incoming optical signal (step S1201). The TIA 120 and the LIA 120 amplify the signal received at step S1201 to have a given amplitude (step S1202).

The preamble detecting unit 144 determines whether a preamble signal has been detected (step S1203). If a preamble signal has not been detected (step S1203: NO), the process continues, returning to step S1203. If a preamble signal has been detected (step S1203: YES), the interval setting unit 145 sets a measurement interval for measuring the amount of dispersion of the preamble signal (step S1204).

The intensity ratio calculating unit 146 acquires information on the average power of the measurement interval of the preamble signal set at step S1204 (step S1205). The intensity ratio calculating unit 146 calculates, based on the information acquired at step S1205 and information on the given amplitude determined in advance for the TIA 120 and the LIA 130, the intensity ratio of the amplitude to the average power of the signal output from the PD 110 (step S1206).

The electronic dispersion compensator 150 performs dispersion compensation based on the intensity ratio calculated at step S1206 (step S1207), and the dispersion compensation operation for one optical signal is completed. Similarly, the operation at steps S1201 to S1207 is repeated for sequentially received optical signals, whereby dispersion compensation for each optical signal is performed.

Figure 13:
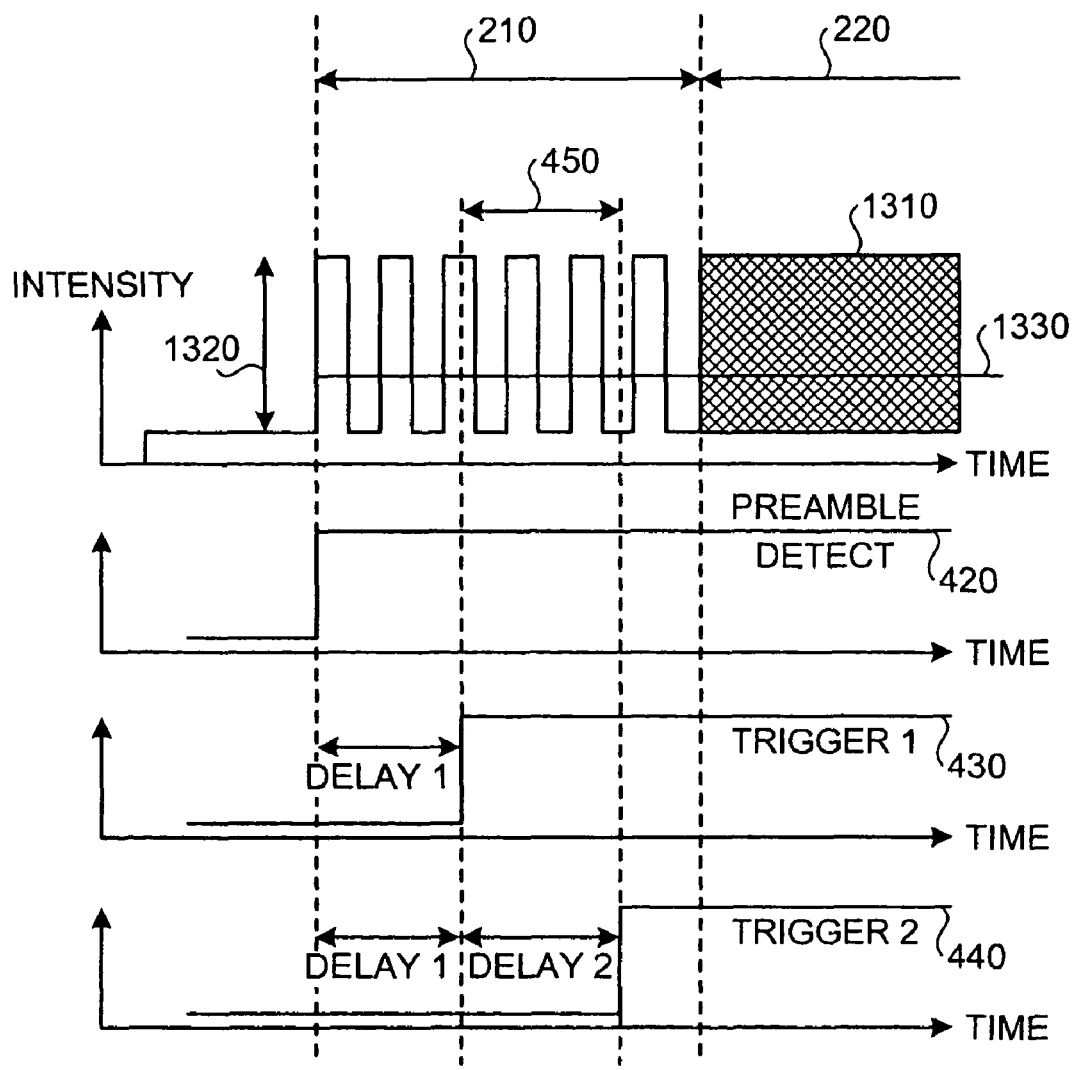
FIG. 13 is a time chart of an operation of the optical communication apparatus according to the second embodiment.

FIG. 13 is a time chart of an operation of the optical communication apparatus according to the second embodiment. In FIG. 13, items identical to those depicted in FIG. 4 are given the same reference numerals used in FIG. 2 and repetitive explanations are omitted. Reference numeral 1310 indicates a signal amplified to have a given amplitude by the TIA 120 and the LIA 130. Reference numeral 1320 indicates the given amplitude of the signal 1310. Reference numeral 1330 indicates the average power of the signal 1310.

The signal 1310 which was amplified to the given amplitude by the TIA 120 and the LIA 130 is input to the dispersion monitoring unit 140. The intensity ratio calculating unit 146 calculates the intensity ratio of the predetermined amplitude 1320 to the average power 1330 indicated by the information output from the average detecting unit 143, thereby calculating an amount of dispersion of the preamble signal 210.

The optical communication apparatus 100 according to the second embodiment also provides advantages of the optical communication apparatus 100 according to the first embodiment, and by calculating the amount of dispersion of the preamble signal amplified to a given amplitude by the TIA 120 and the LIA 130, calculates the amount of dispersion of the preamble signal without calculating amplitude at the intensity ratio calculating unit 146. Consequently, the amount of dispersion of an optical signal can be calculated more swiftly.

Figure 14:
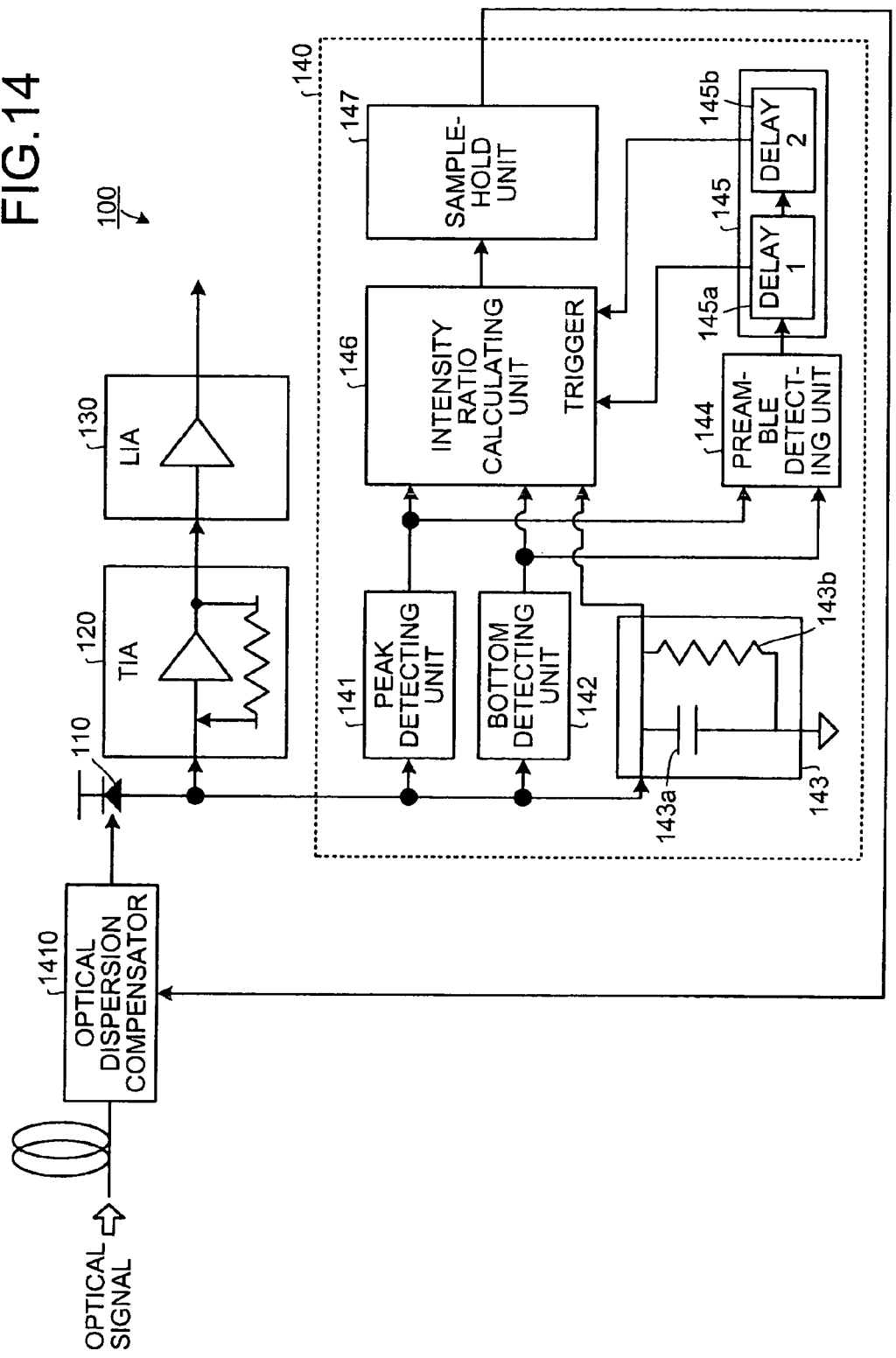
FIG. 14 is a block diagram of an optical communication apparatus according to a third embodiment.

FIG. 14 is a block diagram of an optical communication apparatus according to a third embodiment. In FIG. 14, items identical to those depicted in FIG. 1 are given the same reference numerals used in FIG. 1 and repetitive explanations are omitted. As depicted in FIG. 14, an optical communication apparatus 100 according to the third embodiment includes an optical dispersion compensator 1410 instead of the electronic dispersion compensator 150 included in the optical communication apparatus 100 of FIG. 1. The optical dispersion compensator 1410 is disposed upstream to the PD 110.

The optical dispersion compensator 1410 compensates an optical signal for dispersion by the amount of compensation set by the sample-hold unit 147, the optical signal being transmitted by an external optical transmitting apparatus. The optical dispersion compensator 1410 outputs the compensated optical signal to the PD 110. The PD 110 receives the optical signal output from the optical dispersion compensator 1410. The sample-hold unit 147 sets the amount of compensation for the optical dispersion compensator 1410 according to the amount of dispersion indicated by information output from the intensity ratio calculating unit 146.

According to the optical communication apparatus 100 of the third embodiment, the optical dispersion compensator 1410 is used instead of the electronic dispersion compensator 150 to perform dispersion compensation upstream to the PD 110. In this example, like the optical communication apparatus 100 of the first embodiment, the amount of dispersion of an optical signal can be calculated accurately and swiftly by calculating the amount of dispersion based on the waveform of the preamble signal.

Figure 15:
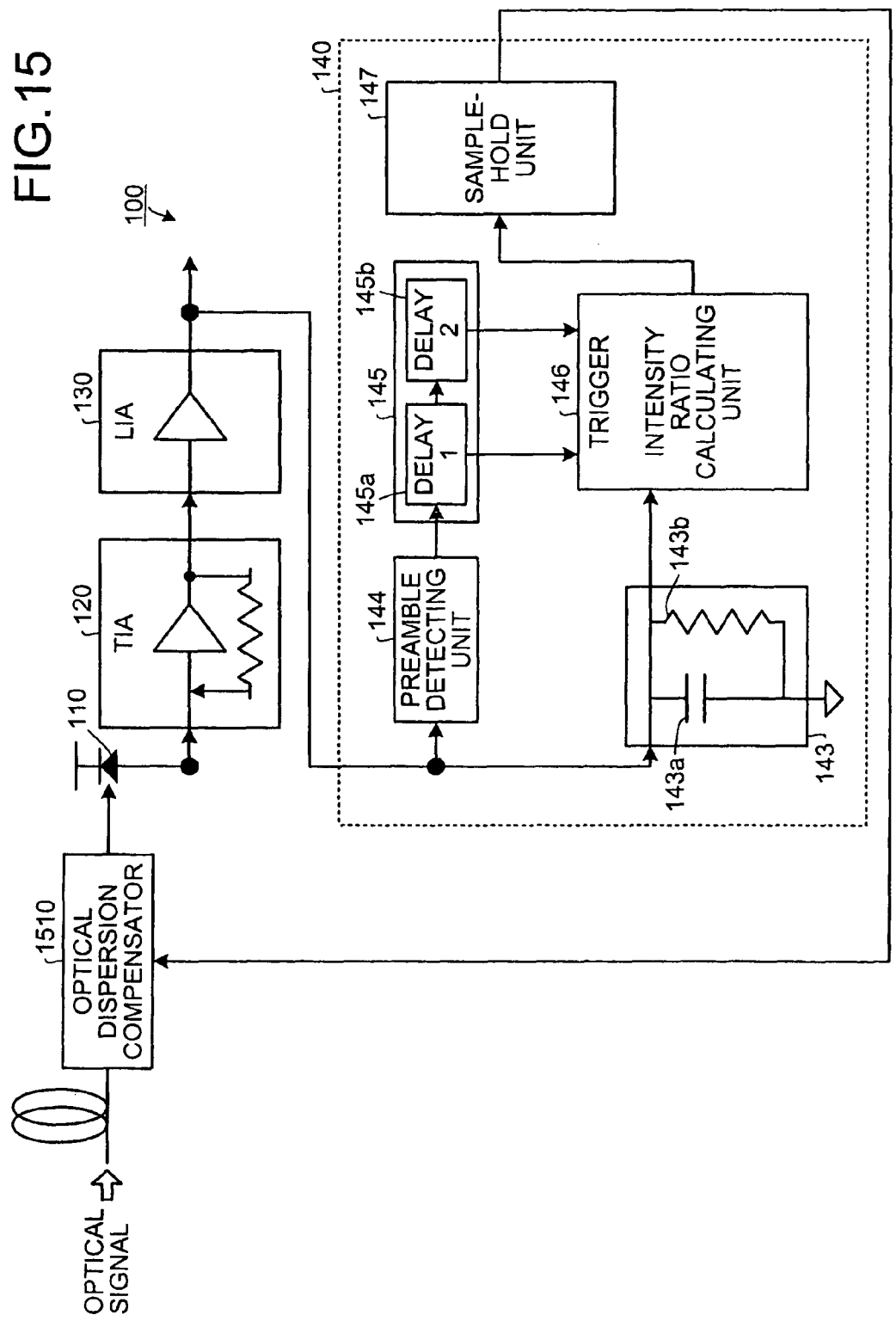
FIG. 15 is a block diagram of an optical communication apparatus according to a fourth embodiment.

FIG. 15 is a block diagram of an optical communication apparatus according to a fourth embodiment. In FIG. 15, items identical to those depicted in FIG. 11 are given the same reference numerals used in FIG. 11 and repetitive explanations are omitted. As depicted in FIG. 15, an optical communication apparatus 100 according to the fourth embodiment includes an optical dispersion compensator 1510 instead of the electronic dispersion compensator 150 included in the optical communication apparatus 100 of FIG. 1. The optical dispersion compensator 1510 is disposed upstream to the PD 110.

The optical dispersion compensator 1510, based on the amount of compensation set by the sample-hold unit 147, compensates an optical signal for dispersion, the optical signal being transmitted by an external optical transmitting apparatus. The optical dispersion compensator 1510 outputs the compensated optical signal to the PD 110. The PD 110 receives the optical signal output from the optical dispersion compensator 1510. The sample-hold unit 147 sets the amount of compensation for the optical dispersion compensator 1510 according to the amount of dispersion indicated by information output from the intensity ratio calculating unit 146.

According to the optical communication apparatus 100 of the fourth embodiment, the optical dispersion compensator 1510 is used instead of the electronic dispersion compensator 150 to perform dispersion compensation upstream to the PD 110. In this example, like the optical communication apparatus 100 of the second embodiment, the amount of dispersion of an optical signal can be calculated accurately and swiftly by calculating the amount of dispersion based on the waveform of the preamble signal.

Figure 16:
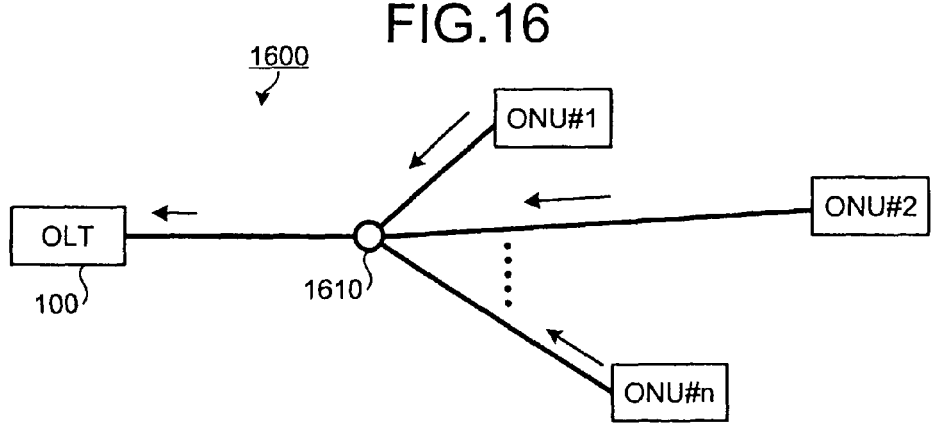
FIG. 16 is a block diagram depicting an example where the optical communication apparatus is applied to a PON.

FIG. 16 is a block diagram depicting an example where the optical communication apparatus is applied to a PON. As depicted in FIG. 16, the optical communication apparatus 100 according to the above embodiments can be applied to an OLT in a network 1600, a PON system. The network 1600 includes the optical communication apparatus 100 (OLT), multiple ONUs #1-#n, and a star coupler 1610.

The optical communication apparatus is connected to the ONUs #1-#n through the star coupler 1610. The optical communication apparatus 100 manages the timing of communication between the optical communication apparatus 100 and the ONUs #1-#n, and transmits information on the timing of communication to each ONU. The ONUs #1-#n transmit optical signals to the optical communication apparatus 100, at the timing indicated by the information output from the optical communication apparatus 100.

Figure 17:
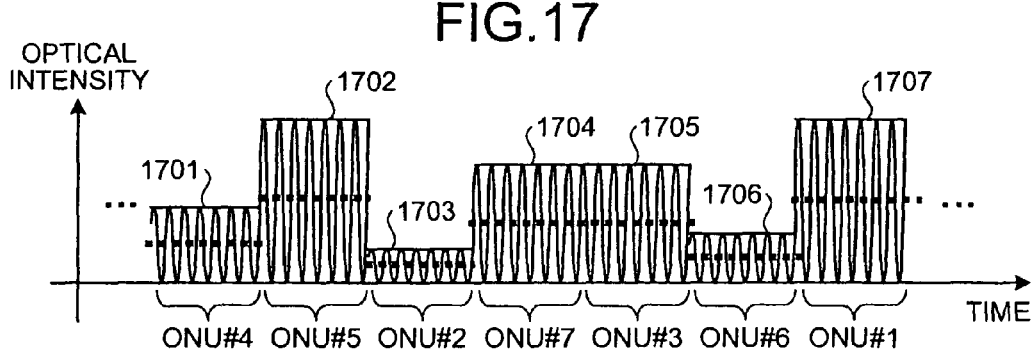
FIG. 17 is a diagram of waveforms of the optical signal received by the optical communication apparatus.

FIG. 17 is a diagram of waveforms of the optical signal received by the optical communication apparatus. In FIG. 17, reference numerals 1701-1707 denotes optical signals received by the optical communication apparatus 100 (OLT). For instance, an optical signal 1701 is transmitted from the ONU #4 and received by the optical communication apparatus 100. An optical signal 1702 is transmitted from the ONU #5 and received by the optical communication apparatus 100 after the optical signal 1701.

The optical signals 1701-1707 deteriorate, the degree of deterioration depending on a transmission line between the optical communication apparatus 100 and the ONU that transmitted the optical signal. Accordingly, as depicted in FIG. 17, the intensity of each optical signal varies. In addition, the amount of dispersion of each optical signal received by the optical communication apparatus 100 also varies (not depicted).

Figure 18:
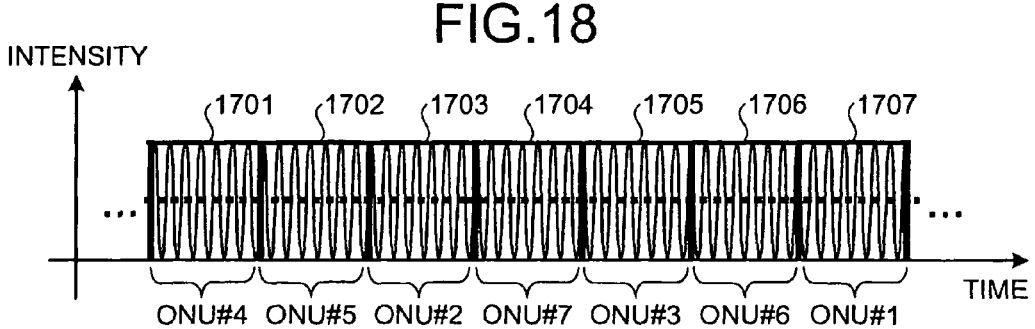
FIG. 18 is a diagram of waveforms of signals compensated by the optical communication apparatus.

FIG. 18 is a diagram of waveforms of signals compensated by the optical communication apparatus. As depicted in FIG. 18, the optical communication apparatus 100 amplifies the optical signals 1701-1707 to a given amplitude. The optical communication apparatus 100, sequentially receiving optical signals 1701-1707, also calculates the amount of dispersion of the preamble signals included in each optical signal and compensates each signal individually for dispersion according to the amount of dispersion calculated (not depicted).

Figure 19:
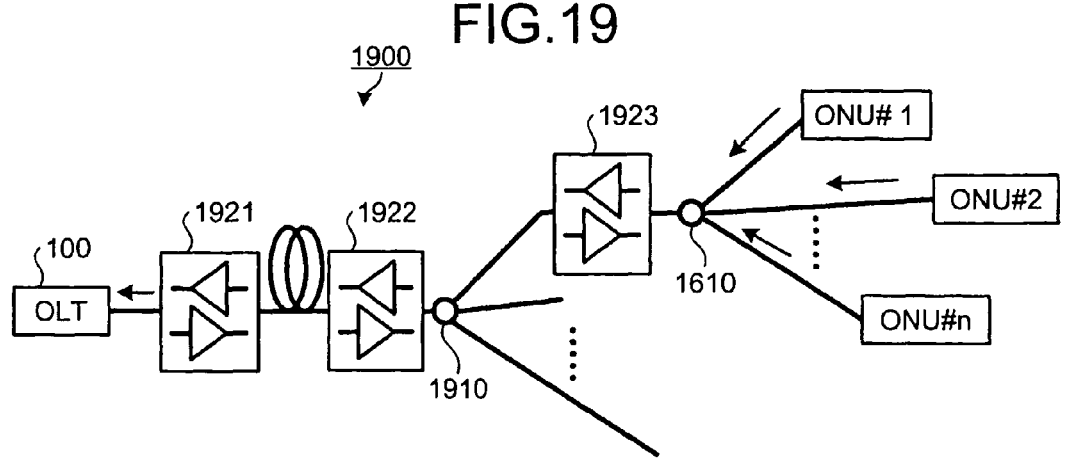
FIG. 19 is a block diagram of an example where the optical communication apparatus is applied to a super PON.
Figure 20:
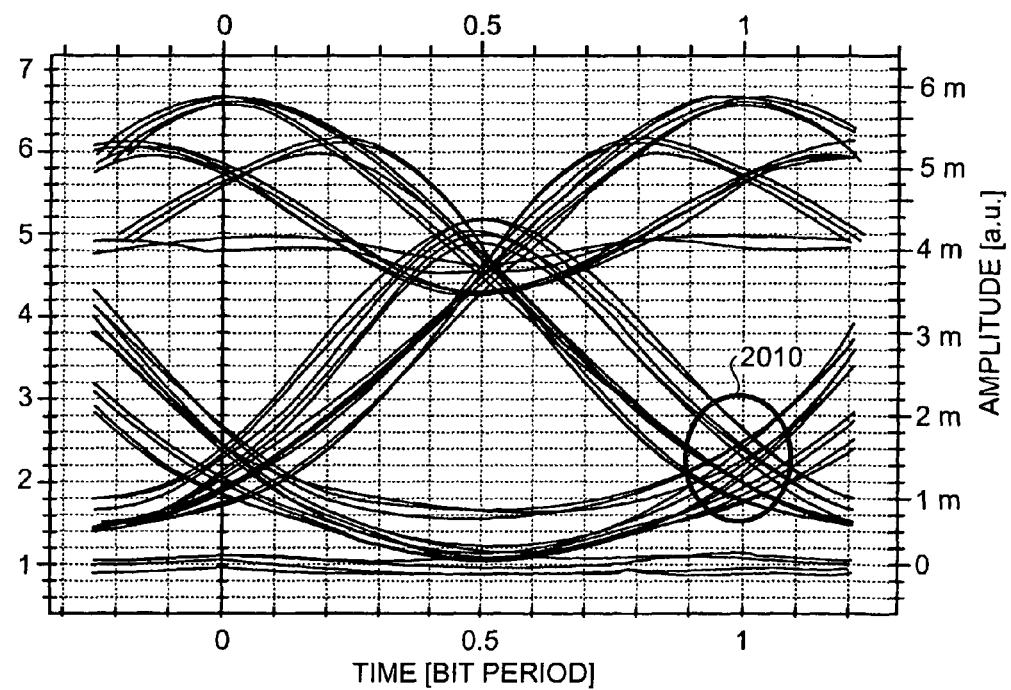
FIG. 20 is an eye pattern of an optical signal transmitted in bursts (a burst signal) having dispersion.

FIG. 19 is a block diagram of an example where the optical communication apparatus is applied to a super PON. In FIG. 19, items identical to those depicted in FIG. 16 are given the same reference numerals used in FIG. 16 and repetitive explanations are omitted. As depicted in FIG. 19, the optical communication apparatus 100 according to the above embodiments can be applied to an OLT in the network 1900, a super PON system.

The network 1900 has the configuration of the network 1600 depicted in FIG. 16 to which a star coupler 1910 is added, connecting more ONUs to the optical communication apparatus 100. Further, optical amplifiers 1921-1923 are inserted in the transmission lines. The optical amplifiers 1921-1923 amplify optical signals transmitted and received between the optical communication apparatus 100 and ONUs #1-#n.

As depicted in FIG. 16 and FIG. 19, the optical communication apparatus 100 according to the embodiments explained above can be applied to an optical communication apparatus, such as an OLT in a PON system, that sequentially receives optical signals transmitted from multiple optical transmitting apparatuses. Consequently, the amount of dispersion of each optical signal is accurately and swiftly calculated, and each optical signal is individually compensated for dispersion.

In the embodiments explained above, although the optical communication apparatus 100 performs dispersion compensation with a dispersion compensation unit, configuration may be such that information on the amount of dispersion calculated by the intensity ratio calculating unit 146 is feedback to the optical transmitting apparatus that has transmitted the optical signal. The optical transmitting apparatus that receives the feedback information induces, with respect to the optical signal, an amount of dispersion that has a characteristic inverse to a characteristic of dispersion indicated by the feedback information, and the optical transmitting apparatus outputs the optical signal. In this way, dispersion compensation can be performed.

As set forth above, distortion of waveform of a signal that is included in an optical signal and has a predetermined pattern corresponds one-to-one to an amount of dispersion of the optical signal. Therefore, according to the configuration explained above, the amount of dispersion is calculated based on the waveform of the signal having the predetermined pattern, thereby enabling the amount of dispersion of the optical signal to be calculated accurately and swiftly.

In other words, the optical signal can be compensated for dispersion accurately and swiftly by a calculation of the amount of dispersion of a preamble signal included in the optical signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical communication apparatus comprising:
   a receiver configured to receive an optical signal;
   a detector configured to detect a predetermined pattern signal included in the optical signal;
   a calculator configured to calculate, based on an intensity ratio of amplitude to average power of the predetermined pattern signal, an amount of dispersion of the predetermined pattern signal; and
   a compensator configured to compensate the optical signal for dispersion, according to the amount of dispersion.

2. The optical communication apparatus according to claim 1, wherein the compensator is an electronic dispersion compensator disposed downstream from the receiver.

3. The optical communication apparatus according to claim 1, wherein the compensator is an optical dispersion compensator disposed upstream from the receiver.

4. The optical communication apparatus according to claim 1, wherein optical signals transmitted from a plurality of optical transmitting apparatuses are sequentially received.

5. An optical communication apparatus comprising:
   a receiver configured to receive an optical signal;
   a detector configured to detect a predetermined pattern signal included in the optical signal,
   a calculator configured to calculate, based on a waveform of the predetermined pattern signal, an amount of dispersion of the predetermined pattern signal; and
   a compensator configured to compensate the optical signal for dispersion, according to the amount of dispersion, wherein
   the optical signal includes the predetermined pattern signal received as a preamble signal and includes a data signal received after the predetermined pattern signal, and
   the compensator compensates at least the data signal for dispersion, according to the amount of dispersion.

6. An optical communication apparatus comprising:
   a receiver configured to receive an optical signal;
   a detector configured to detect a predetermined pattern signal included in the optical signal;
   a calculator configured to calculate, based on a waveform of the predetermined pattern signal, an amount of dispersion of the predetermined pattern signal; and
   a compensator configured to compensate the optical signal for dispersion, according to the amount of dispersion, wherein the calculator calculates the amount of dispersion of the predetermined pattern signal, based on a pulse width of the predetermined pattern signal.

7. The optical communication apparatus according to claim 6, wherein the calculator calculates the pulse width based on amplitude and average power of the predetermined pattern signal.

8. The optical communication apparatus according to claim 6, further comprising an amplifier configured to amplify to a given amplitude, an electrical signal transmitted from the receiver, wherein
   the calculator calculates the pulse width based on average power of the amplified electrical signal.

9. An optical communication apparatus comprising:
   a receiver configured to receive an optical signal;
   a detector configured to detect a predetermined pattern signal included in the optical signal;
   a calculator configured to calculate, based on a waveform of the predetermined pattern signal, an amount of dispersion of the predetermined pattern signal;
   a compensator configured to compensate the optical signal for dispersion, according to the amount of dispersion; and
   a setting unit configured to set, for use in calculating the amount of dispersion, an interval of the predetermined pattern signal,
   wherein the calculator calculates the amount of dispersion for the interval.

10. An optical communication method comprising:
    receiving an optical signal;
    detecting a predetermined pattern signal included in the optical signal;
    calculating, based on an intensity ratio of amplitude to average power of the predetermined pattern signal, an amount of dispersion of the predetermined pattern signal; and
    compensating for dispersion according to the amount of dispersion.

* * * * *

UNITED STATES PATENT AND TRADEMARK OFFICE
CERTIFICATE OF CORRECTION

| | |
|---|---|
| PATENT NO. | : 8,311,418 B2 |
| APPLICATION NO. | : 12/659083 |
| DATED | : November 13, 2012 |
| INVENTOR(S) | : Yukito Tsunoda et al. |

It is certified that error appears in the above-identified patent and that said Letters Patent is hereby corrected as shown below:

In the Claims:

Column 11, Line 29, In Claim 5, delete "signal," and insert -- signal; --, therefor.

Signed and Sealed this
Seventh Day of May, 2013

Teresa Stanek Rea
*Acting Director of the United States Patent and Trademark Office*